United States Patent
Pardue (10) Patent No.: US 9,708,975 B2
(45) Date of Patent: Jul. 18, 2017

(54) OSCILLATING ROTARY ENGINE (71) Applicant: Steven Edward Pardue, North Palm Beach, FL (US)

(72) Inventor: Steven Edward Pardue, North Palm Beach, FL (US)

(*) Notice: Subject to any disclaimer, the term of this patent is extended or adjusted under 35 U.S.C. 154(b) by 396 days.

(21) Appl. No.: 14/519,371

(22) Filed: Oct. 21, 2014

(65) Prior Publication Data
US 2016/0108804 A1  Apr. 21, 2016

(51) Int. Cl.
*F02B 53/12* (2006.01)
*F02B 53/00* (2006.01)

(52) U.S. Cl.
CPC .............. *F02B 53/00* (2013.01); *Y02T 10/17* (2013.01)

(58) Field of Classification Search
USPC ........................................................ 123/210
See application file for complete search history.

(56) References Cited

U.S. PATENT DOCUMENTS

| | | | | |
|---|---|---|---|---|
| 3,730,654 A | * | 5/1973 | McMahon | F01C 1/077 418/34 |
| 3,837,323 A | * | 9/1974 | Delfino | F01C 1/3566 123/229 |
| 3,897,759 A | * | 8/1975 | Sasaki | F02B 53/12 123/210 |
| 6,640,779 B1 | * | 11/2003 | Thiyagarajan | F01M 11/02 123/193.4 |
| 2006/0027207 A1 | * | 2/2006 | Hangan | F01C 1/077 123/245 |
| 2011/0271830 A1 | * | 11/2011 | Sole | F01C 9/002 92/120 |

FOREIGN PATENT DOCUMENTS

WO  WO03093650  * 11/2003

* cited by examiner

*Primary Examiner* — Nina Bhat (57) ABSTRACT

An oscillating rotating engine has one or more rotating and oscillating rotors traveling around a shaft, crankshaft or central axis. As the rotor oscillates and rotates in one consistent motion, successive chambers are positioned at intake, compression, ignition, and exhaust locations to complete the two or four cycle combustion sequence, one or more times per rotation in relation to the accompanying housings. Igniting the air-fuel mixture in the ignition position causes the rotor to oscillate and rotate, and if present, rotate the crank shaft.

18 Claims, 10 Drawing Sheets

Motion

FIG. 8B

Motion

FIG. 8C

Motion

OSCILLATING ROTARY ENGINE

CROSS REFERENCE TO RELATED PATENTS

There are no provisional, or co-pending related patents.

FEDERALLY SPONSORED RESEARCH OR DEVELOPMENT

This patent has not been developed using any federally sponsored research or development funding.

REFERENCE TO SEQUENCE LISTING, A TABLE, OR A COMPUTER PROGRAM COMPACT DISK APPENDIX

Not Applicable.

BACKGROUND OF THE INVENTION

Notice of Copyright and Trade Dress

A portion of the disclosure of this patent document contains material that is subject to copyright protection. This patent document may show or describe matter that is or may become trade dress of the owner. The copyright and trade dress owner has no objection to the facsimile reproduction by anyone of the patent disclosure as it appears in the Patent and Trademark Office files or records, but otherwise reserves all copyright and trade dress rights whatsoever.

Field

Oscillating, rotating, internal combustion engines.

General Background and State of the Art

Internal combustion engines burn fuel in their combustion chambers in the presence of oxygen (normally from air). Burning generates high temperature and pressure gases, which expand and apply force against a movable engine part or parts. Movement of the part(s) produces mechanical energy. Thus, an internal combustion engine converts potential chemical energy in the oxygen fuel mixture into kinetic mechanical energy. Therefore, they provide power to operate vehicles, machinery, electric generators, pumps, and other equipment.

Internal combustion engines fall into two categories; intermittent and continuous. Piston engines either four or two-stroke are the most common intermittent engines, while less common rotary type engines are also intermittent. Continuous combustion engines include gas turbines and jet engines.

Gas turbines and jet engines are impractical for most land and water vehicle use due to their inefficiency at low rotations per minute, although at high RPM's they are among the most efficient engines. For this reason, reciprocating piston engines and rotary engines have been used most frequently in this class of vehicle even though they are less efficient overall than continuous combustion engines.

Both rotary and piston engines compress their air-fuel mixture in a combustion chamber and ignite the mixture with either a spark, or ultra-high compression. The resulting combustion and movement of the movable part(s) transforms the chemical energy to mechanical energy.

Rotary internal combustion engines were first patented in the early 1900's. Improvements, variations and other constructions of "rotary" engines have been made through recent years. covering various rotary engine designs. Rotary vane type engines were developed to help reduce energy loss. Axial engines were also developed to attempt to reduce vibration and increase power output.

Various other engine types have been discussed to help reduce the number of parts or increase efficiency; however, few of them have seen commercialization.

BRIEF SUMMARY OF THE INVENTION

Object of the Invention

An object is to eliminate numerous parts of traditional piston reciprocating engines and rotary vane engines that create resistance, parasitic loss, failure points, asymmetric velocity curves, vibration, and wear. Another object is to generate additional ignition opportunities per rotation of the oscillating rotor or crank shaft than traditional two or four-stroke piston engines or rotary vane engines reducing friction, heat, energy loss, and lubrication requirements while increasing potential for torque. Another object is to generate more rotational force from combustion than traditional two or four-stroke piston engines reducing friction, heat, energy loss, and lubrication requirements while increasing potential for torque. Another object is to generate additional ignition opportunities per rotation of the oscillating rotor or crank shaft than traditional two or four-stroke rotary engines reducing friction, heat, energy loss, and lubrication requirements while increasing potential for torque. Another object is to generate additional ignition opportunities per rotation of the oscillating rotor or crank shaft than traditional two or four-stroke axial engines and rotary vane engines reducing friction, heat, energy loss, and lubrication requirements while increasing potential for torque.

An oscillating rotating engine has one or more rotating and oscillating rotors traveling around a shaft, crankshaft or central axis while oscillating or reciprocating along a perpendicular plane in relation to the rotation. As the rotor oscillates and rotates in one consistent motion in relation to the front and back housing, successive chambers are created by opposing valleys and crests of the rotor and front housing as well as the rotor and back housing. These chambers are positioned to create intake, compression, ignition, and exhaust locations on the front and back side of the oscillating rotor to complete the four cycle combustion sequence or the two cycles of a 2 cycle combustion sequence, one or more times per rotation. Igniting the air-fuel mixture in the ignition position causes the rotor to oscillate and rotate, and if present, rotate the crank shaft. The diameter of the rotor can be made to any measurement to accommodate a wide variety of needs, and the path the oscillating rotator travels can be set to sinusoidal, saw-tooth, or any combination of motion paths to accommodate the needs of many applications by modulating the angle of the valleys and crests on the rotor, front housing and back housing.

BRIEF DESCRIPTION OF THE SEVERAL VIEWS OF THE DRAWINGS

Preferred forms of the present invention will now be described with reference to the accompanying drawings in which:

Each FIG. 2A, FIG. 2B, FIG. 3A, and FIG. 3B show the opening 14 where a crank shaft 24 will be attached, inserted or fixed.

DETAILED DESCRIPTION OF THE INVENTION

Reference will now be made in detail to various exemplary embodiments and features of the invention, examples of which are illustrated in the accompanying drawings. The following detailed description is provided to give the reader a more thorough understanding of certain features, and should not be considered as a limitation on any aspect of the invention. Numerous embodiments are contemplated that may include additional oscillating rotors, various oscillating rotor paths of operation, multiple seal systems, numerous crank shafts, different diameters, different sizes of combustion chambers, and relocation of the intake and exhaust ports, movement of the spark and oil metering ports and other alterations.

The internal combustion engine of the present invention has numerous features and combinations of features that provide improvements in heat loss, friction reduction, power generation, adaptability, fuel economy, and other beneficial improvements to other commercially available engines. A notable feature of the Oscillating Rotor Engine is the reduction in moving and stationary parts. This reduction in parts will reduce costs to manufacture, maintain, repair and operate the engine. Each component of the invention has multiple functions reducing the need for ancillary attachments and equipment to keep the engine operating. Another notable feature is that each oscillating rotor and end housing can have any even-number of crests and valley's creating an infinite number of combustion cycles per rotation of the oscillating rotor or crank shaft. Higher numbers of combustion cycles will increase the torque on the crank shaft and power output of the engine. Another notable feature is that a four crested oscillating rotary engine will complete one full thermodynamic cycle of the four cycle combustion process in one hundred and eighty degrees of rotation of the crank shaft, a six crested oscillating rotary engine will complete one full thermodynamic cycle of the four cycle combustion process in one hundred and twenty degrees of rotation of the crank shaft, and higher number crested oscillating rotary engines will achieve a full four cycle combustion process in even smaller degrees of rotation. Additionally, each time a four crested embodiment of the oscillating rotary engine completes one thermodynamic cycle the engine will have completed four combustion phases in the same one hundred and eighty degrees of rotation. This is a significant reduction in total displacement volume when compared to piston four cycle engines which complete a full thermodynamic cycle in seven hundred and twenty degrees of rotation of the crank shaft. A similar notable feature is that the diameter of the oscillating rotor and front and back housings can be increased at the outer diameter, inner diameter or both, increasing the radius of each crest and valley to increase or adjust the torque on the crank shaft. Increasing the outer diameter alone will increase the combustion chamber size and torque, while increasing both the inner and outer diameter equally will increase torque by increasing centrifugal leverage on the crank shaft while maintaining the same or similar combustion chamber size. Another notable feature is that the engine may include numerous oscillating rotors connected by a common crank shaft or connected using gears, pulleys or chains allowing increased power on a common drive shaft. In addition, multiple oscillating rotors can be operated offset from one another, crest to crest, valley to valley, to nearly perfectly balance the engine without the use of a flywheel or other balancing weights or mechanisms. This allows the oscillating rotors to move toward each other and away from each other simultaneously. Alternatively, one or more of these oscillating rotors can be used to compress the incoming charge of air and fuel mixture without a combustion cycle to act as a built in supercharger and pass the charge of air/fuel on to another oscillating rotor that provides combustion. Another notable feature is the combustion cycle will be done in rotation with the crank shaft rather than vertical or horizontal as in reciprocating piston engines allowing more of energy to be delivered to the engine output rather than lost to parasitic loss or heat.

Another notable feature is that as the oscillating rotor moves through the various stages of combustion the oscillating rotor does not reverse its direction in relation to the rotational direction of the crank shaft. The current oscillating rotor does not directly return to its original position as do other oscillating engines, but rather continually rotates around the crank shaft in one direction at the same rate as the crank shaft while oscillating based on the crests and valleys on the front housing, back housing and oscillating rotor. The motion path of the oscillating rotor in the current engine would be similar to a sine wave, or potentially a saw-tooth wave, traveling around the crank shaft in one continuous direction. In previous oscillating engine designs, the fully exhausted location of the oscillating rotor is the same location, in relation to the other housings, as the fully compressed location of the oscillating rotor. This requires the oscillating rotor in previous designs to move in rotation with the crank shaft as well as the opposite rotational direction of the crank shaft, forcing stagnation of the oscillating rotor between motions, losing energy and efficiency in the process. The current oscillating rotating engine eliminates this motion as well as the series of complex gearing, linkage and connection mechanisms needed to connect the oscillating rotor to the crank shaft previous designs require. Instead the current oscillating rotating engine can connect the crankshaft to the oscillating rotor directly, or via sliding stationary gear.

Components in the engine embodiments will be made from suitable materials able to withstand the heat and pressures developed by the operation of the engine and external factors. Examples of such materials are Aluminum, iron, stainless steel, alloy's, composites, carbon fibers or numerous other materials dependent upon the application to which the engine will be applied.

Turning now to the figures; examples of engines, their constituent parts, and their modes of action are described. According to the exemplary engines, non-limiting optional features include: varying its compression relation enabling the use of different fuels, alteration of the oscillating rotor path based on shape and amplitude, optimization of constituent parts such as exact location of intake, exhaust, ignition and oil metering ports, diameter of the engine both internal and external measurements, and altering materials of construction.

Figure 1A:
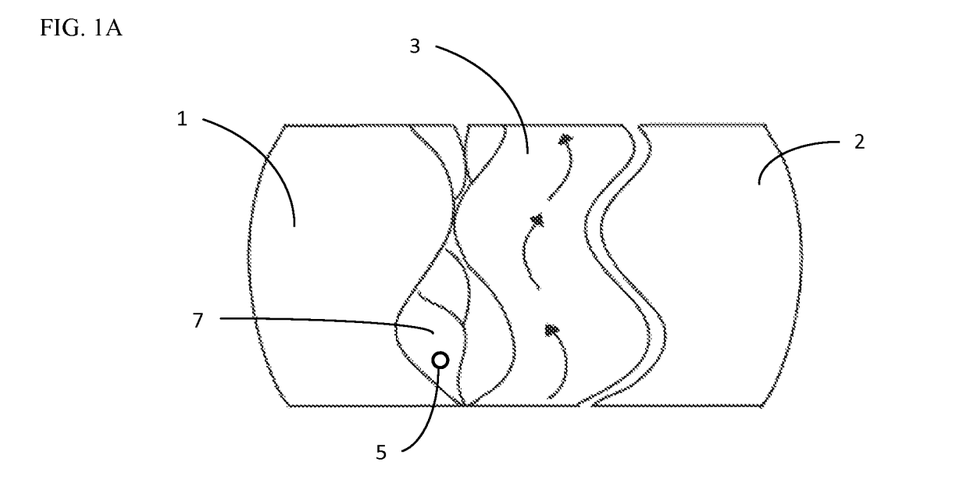
FIG. 1A shows an oscillating rotating engine using a sinusoidal path in the fully expanded combustion phase in a four cycle engine operation in relation to the oscillating rotor 3 and the front housing 1. Surface 7 is the trailing face of one of two crests 15 of front housing 1 where combustion has taken place.
Figure 1B:
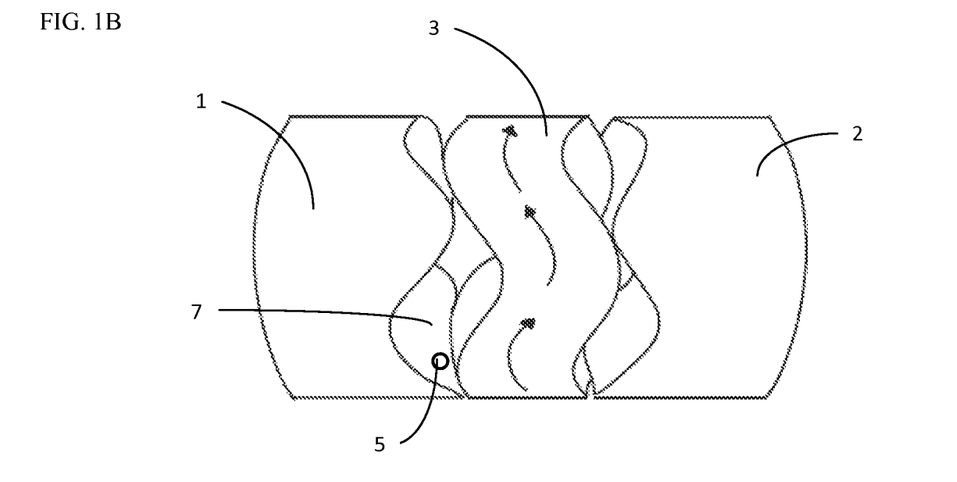
FIG. 1B shows an oscillating rotating engine with the oscillating rotor 3 passing into the exhaust phase of the four cycle engine operation in relation to the front housing 1, and compression phase in relation to the back housing 2.
Figure 1C:
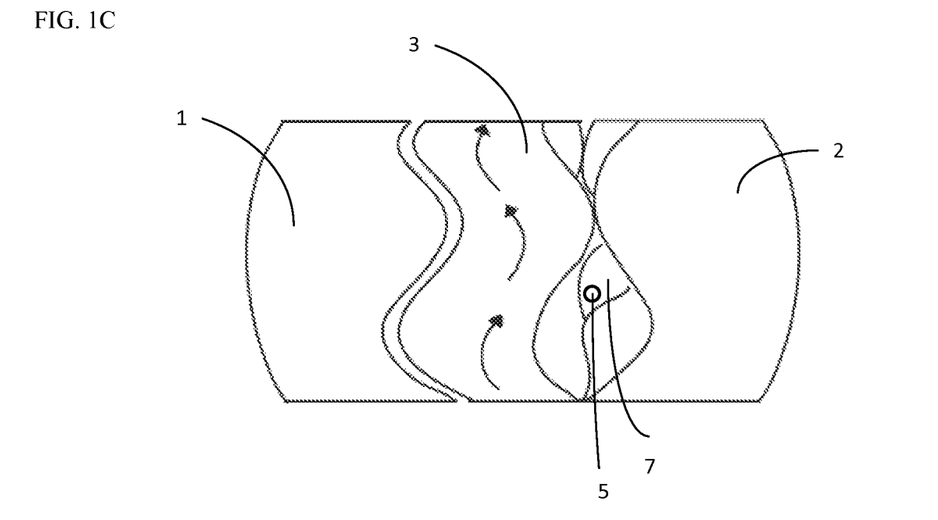
FIG. 1C shows an oscillating rotating engine completing the exhaust phase and passing into the intake phase of the four cycle engine operation in relation to the oscillating rotor 3 and front housing 1. This also depicts one of two locations, or chambers, 7 on the back housing 2 where combustion took place between opposing valleys and crests to create this motion of the oscillating rotor 3.

Now referring to FIG. 1A, FIG. 1B, and FIG. 1C, there is shown a oscillating rotating engine device without the outer housing 4 in accordance with a four crested embodiment. Component 1 represents the front housing of the oscillating rotating engine that forms the front enclosure against the oscillating rotor 3, inside outer housing 4, and creates the four chambers of the four cycle combustion process on the front side of the oscillating rotor 3. Component 2 represents the back housing of the oscillating rotating engine that forms the back enclosure against the oscillating rotor 3, inside outer housing 4, and creates the four chambers of the four cycle combustion process on the back side of the oscillating rotor 3. When the oscillating rotor 3 is at full compression/exhaust against the front housing 1, two combustion chambers 6 on the front side of the oscillating rotor will align with two spark plug/igniter 5 locations on the front housing allowing generation of combustion. Additionally at this moment in operation, the oscillating rotor 3 will be at full intake/combustion-expansion against the back housing 2, creating two opposing cycles of the combustion process on either side of the oscillating rotor at all times of operation.

Figure 3A:
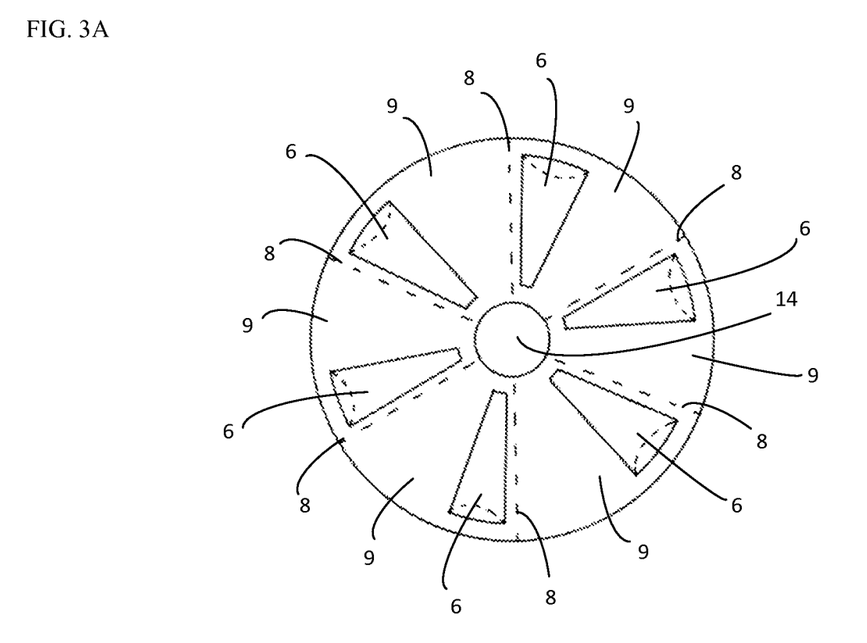
FIG. 3A depicts the front side of an oscillating rotor in an alternate embodiment with six crests 8 and six valleys 9 expanding radially from the central crank shaft opening 14 to the outer edge of the oscillating rotor nearest the outer housing from a direct view perspective.
Figure 6:
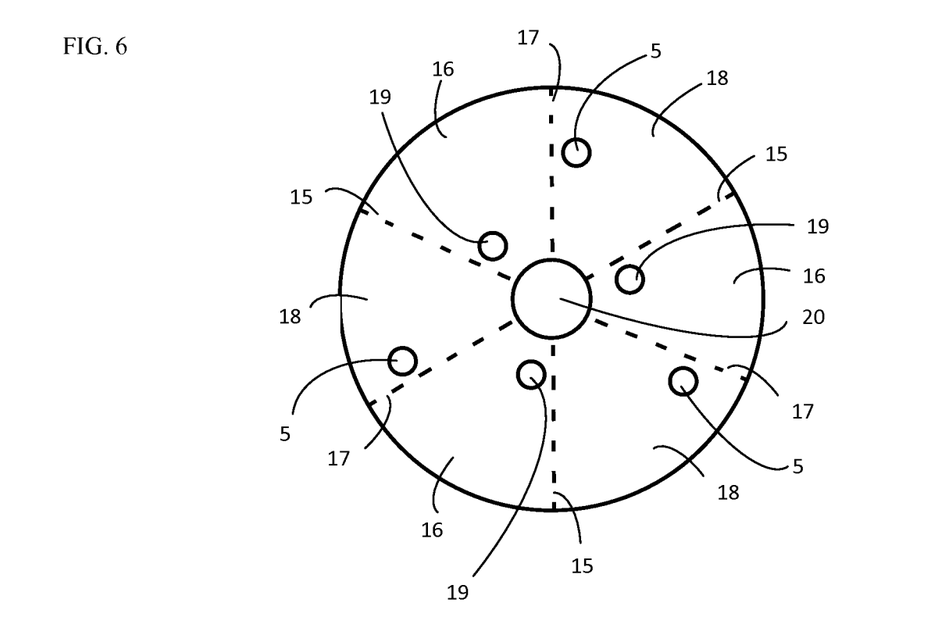
FIG. 6 shows the inside of the front housing where all four cycles of the engine process will take place in a six crest embodiment as the oscillating rotor rotates. This front housing will have ports for spark plug or ignition insertion 5, a crank shaft 24 to freely pass through 20, and for oil metering pump insertion 19 if needed for the application. The apex of each crest and valley on the front housing FIG. 6 will mark the end of one cycle and the beginning of another cycle in the four cycle process; combustion crest 15, exhaust valley 16, intake crest 17 and compression valley 18.

In a different embodiment with six crests and valleys per side of the oscillating rotor and end housings as depicted in FIG. 3A, FIG. 3B, FIG. 3C, FIG. 6, and FIG. 7, when the oscillating rotor is at full compression/exhaust against the front housing FIG. 6, three combustion chambers 6 on the front side of the oscillating rotor FIG. 3A, will align with three spark plug/igniter 5 locations on the front housing FIG. 6 allowing generation of combustion. Additionally at this moment in operation, the oscillating rotor will be at full intake/combustion-expansion against the back housing FIG. 7, creating three opposing cycles of the combustion process on either side of the oscillating rotor.

Referring now to the embodiment with four crests and valleys, FIG. 1A shows an oscillating rotating engine in the fully expanded combustion phase and a fully ingested intake position in a four cycle engine operation in relation to the front housing 1. At the same time, this figure depicts the oscillating rotating engine at the fully compressed and fully exhausted phase of the four cycle engine operation in relation to the back housing 2. As the oscillating rotor 3 moves through the cycle, it passes a combustion chamber 6 located just behind each and every crest 8, 10 on both sides of the oscillating rotor across the spark plug/ignition location 5 on every crest 15 which is every other crest of the front 1 and back 2 housings. When the engine is in this position, the spark plugs 5 on the back housing 2 ignite creating combustion in the combustion chamber 6 driving the oscillating rotor along its motion path shown by the arrows in FIG. 1A, FIG. 1B, and FIG. 1C.

The oscillating rotor continues rotating and reaches the location shown in FIG. 1B where the engine is passing into the exhaust phase of the four cycle engine operation in relation to the front housing 1. The oscillating rotor 3, continues its motion to the fully exhausted and compressed phase of the four cycle engine operation in relation to the front housing 1 shown in FIG. 1C.

FIG. 1C also depicts one of two locations 7 on the back housing 2 where combustion took place to create this motion of the oscillating rotor 3. The continued motion of the oscillating rotor 3 repeats this process as each crest of the oscillating rotor moves through the engine on both sides of the oscillating rotor, alternating combustion from the front side to the back side of the oscillating rotor.

Figure 2A:
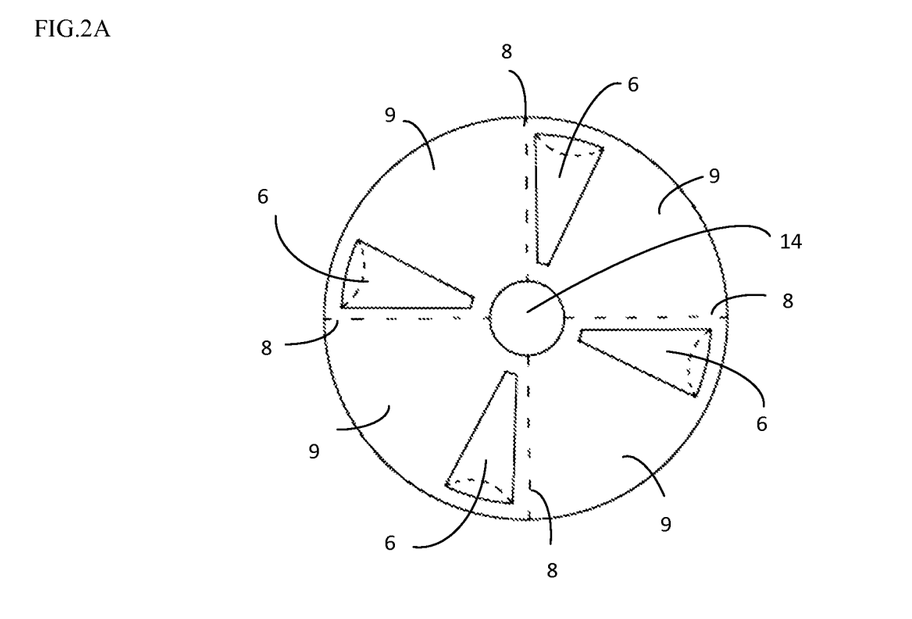
FIG. 2A depicts the front side of an oscillating rotator in the same embodiment with four crests 8 and four valleys 9 expanding radially from the central crank shaft opening 14 to the outer edge of the oscillating rotor nearest the outer housing from a direct view perspective.
Figure 2B:
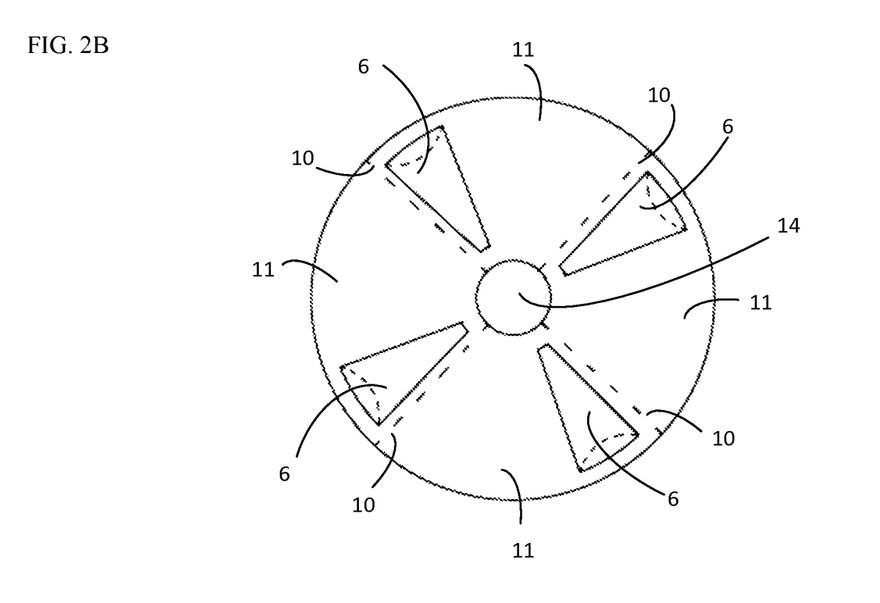
FIG. 2B depicts the back side of the same oscillating rotor in the same embodiment with four crests 10 and four valleys 11 expanding radially from the central crank shaft opening 14 to the outer edge of the oscillating rotor nearest the outer housing from a direct view perspective where the crests are forty five degrees offset from the front side of the same oscillating rotor causing the width of the oscillating rotor 13 to be a uniform measurement as shown in FIG. 2C.
Figure 2C:
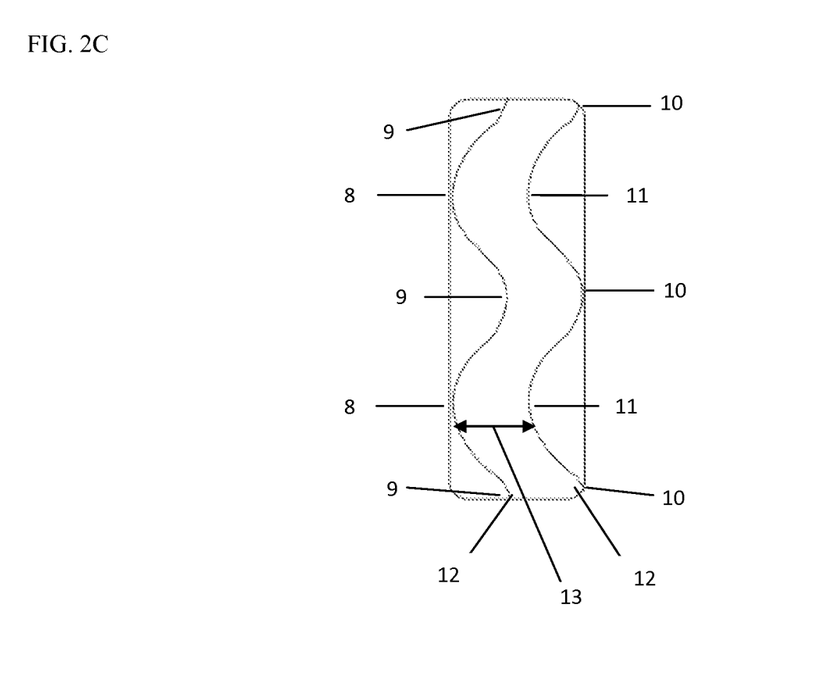
FIG. 2C shows the side view of the same oscillating rotor in the same embodiment with four crests per side 8, 10 and four valleys per side 9, 11 from a direct view perspective.

FIG. 2A depicts the front of the oscillating rotor and FIG. 2B depicts the back of the oscillating rotor in an engine design with four valley's and crests on each side of the oscillating rotor. In this embodiment, the crests 8 and 10 on the opposing sides of the oscillating rotor are forty five degrees offset from one another allowing the crest 8 on one side of the oscillating rotor to coincide with the valley 11 on the opposing side (e.g. mating crest 8 in FIG. 2A with valley 11 in FIG. 2B). This embodiment creates a sinusoidal shape, but may also be saw tooth, or other corresponding shape to the oscillating rotor shape when viewed from the side as shown in FIG. 2.c. The front face FIG. 2A and back face FIG. 2B of the oscillating rotor 3 show depressions or combustion chambers 6 on the trailing side of each crest 8 and 10 allowing combustion to take place as each crest passes the spark plug/igniter 5 on the front housing FIG. 4 or back housing FIG. 5. The crank shaft 24 in will pass through the opening 14 in the center of the oscillating rotor, and be connected by one of many methods including but not limited to a fixed mono-block connection where the rotor and crank shaft 24 are one contiguous piece, bearing system allowing one or more pieces, bearing and guide, rack and pinion, gimbal, caster, rocker arm, sliding gear, fixed sliding gear, or other means. The crank shaft 24 will pass through the front housing (1, FIG. 4) at location 20, back housing (2, FIG. 5) at location 21 or both, and exit the engine to create power or drive accessories.

In this embodiment the crank shaft 24 acts as a seal between the front housing 1 and the front side of the oscillating rotor FIG. 2A, as well as the back housing 3 and the back side of the oscillating rotor FIG. 2B as it rotates in opening 20 and 21. In alternate embodiments, a separate seal or multiple seals may be inserted around the crank shaft 24 forming the inner circumference seal between the front housing 1 and front side of the oscillating rotor FIG. 2A through openings 20 and 14 respectively, as well as the back housing 2 and the back side of the oscillating rotor FIG. 2B through openings 21 and 14 respectively.

FIG. 2C, the side view of an oscillating rotor, depicts a location at or behind the edge of the oscillating rotor where a seal system 12 would be placed running the entire circumference of both front and back sides of the oscillating rotor. This seal system will seal each successive combustion chamber formed between the oscillating rotor, the outer housing 4 and the back housing to which the oscillating rotor is mated FIG. 4, or FIG. 5.

In a different embodiment not shown in the figures, where no crank shaft 24 is present, the opening 14 in the oscillating rotor will be solid with seals in place, and the front and back housings will have corresponding seals where the crank shaft 24 would otherwise be located at site 20 and 21. Such uses for this type of embodiment may include use as a range extender for electric vehicles or generators where the oscillating rotor moves through a magnetic field.

Figure 3B:
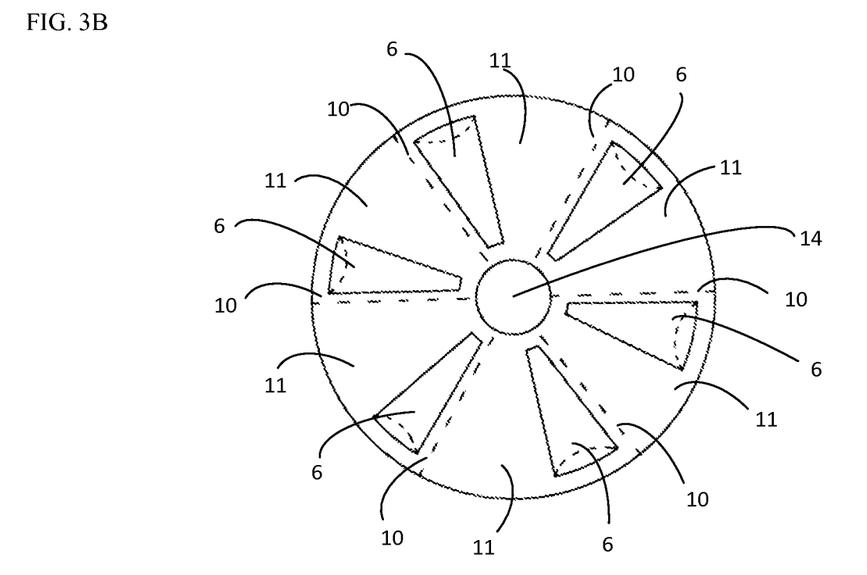
FIG. 3B depicts the back side of an oscillating rotor in the alternate embodiment with six crests 10 and six valleys 11 expanding radially from the central crank shaft opening 14 to the outer edge of the oscillating rotor nearest the outer housing from a direct view perspective where the crests are thirty degrees offset from the front side of the same oscillating rotor causing the width of the oscillating rotor 13 to be a uniform measurement as shown in FIG. 3C.
Figure 3C:
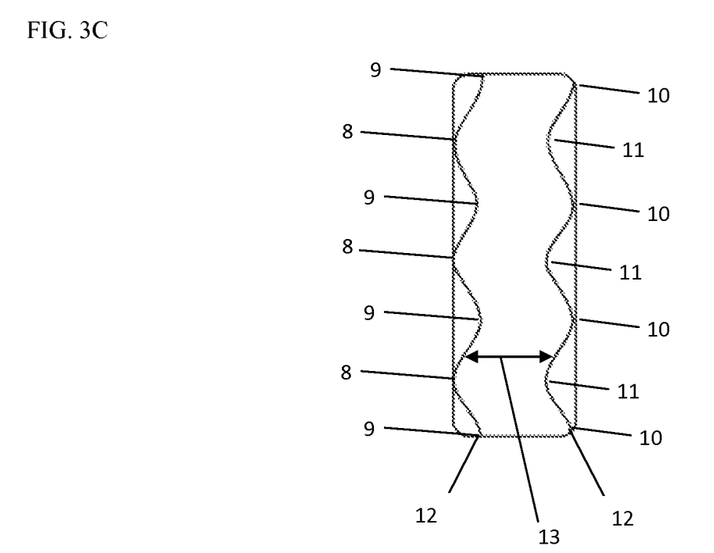
FIG. 3C shows the side view of an oscillating rotor in the alternate embodiment with six crests per side 8, 10 and six valleys per side 9, 11 from a direct view perspective.

Representing an alternate embodiment, FIG. 3A depicts the front of an oscillating rotor and FIG. 3B depicts the back of an oscillating rotor in an engine design with six valley's and crests on each side of the oscillating rotor. In this embodiment, the crests 8 and 10 on the opposing sides of the oscillating rotor are thirty degrees offset from one another allowing the crest on one side of to coincide with the valley on the opposing side (e.g. mating crest 8 in FIG. 3A with valley 11 in FIG. 3B). The degree of offset always corresponds in relation to the number of crests and valleys the particular embodiment contains. This embodiment creates a sinusoidal shape, but could be saw tooth, or other corresponding shape to the oscillating rotor shape when viewed from the side as shown in FIG. 3C. The front face FIG. 3A and back face FIG. 3B of the oscillating rotor show depressions or combustion chambers 6 on the trailing side of each crest 8 and 10 allowing combustion to take place as each crest passes the spark plug/igniter 5 on the front housing FIG. 6 or back housing FIG. 7. The crank shaft 24 will pass through the opening 14 in the center of the oscillating rotor, and be connected by one of many methods including but not limited to a fixed mono-block connection where the rotor and crank shaft 24 are one contiguous piece, bearing system allowing two or more pieces, bearing and guide, rack and pinion, gimbal, caster, rocker arm, sliding gear, fixed sliding gear, or other means. The crank shaft 24 will pass through, either the front housing FIG. 6 at location 20, back housing FIG. 7 at location 21, or both, and exit the engine to create power or drive accessories.

FIG. 3C, the side view of an oscillating rotor, depicts a location just at or behind the edge of the oscillating rotor where a seal system 12 would be placed. This seal system will seal each successive combustion chamber formed between the oscillating rotor, the outer housing and the front and back housings to which the oscillating rotor is mated FIG. 6, or FIG. 7.

Figure 4:
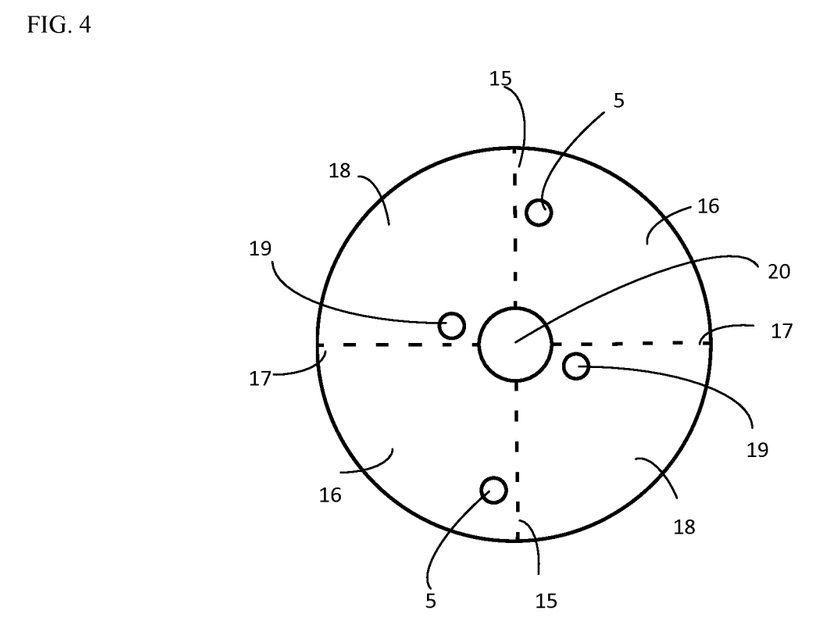
FIG. 4 shows the inside of the front housing where all four cycles of the engine process will take place in a four crest embodiment as the oscillating rotor rotates. This front housing will have ports for spark plug or ignition insertion 5, a crank shaft 24 to freely pass through 20, and for oil metering pump insertion 19 if needed for the application. The apex of each crest and valley on the front housing FIG. 4 will mark the end of one cycle and the beginning of another cycle in the four cycle process; combustion crest 15, exhaust valley 16, intake crest 17 and compression valley 18.

With reference to FIG. 4, the inner surface of the front housing 1 is shown in a direct viewpoint displaying potential locations for spark plug/igniters 5 located at the apex of, or just after crests 15 where combustion will take place on a four crested oscillating rotor engine. Additional spark plug/igniters 5 may be located at additional sites on or after the surface of the combustion crests 15 to optimize ignition in that chamber for the application. Additionally, FIG. 4 shows potential locations for one or more oil metering pumps 19 at or just after the apex of crests 17 to lubricate the oscillating rotor 3. Additional oil metering pumps may be included in other locations in other embodiments to optimize lubrication for the desired application.

Figure 5:
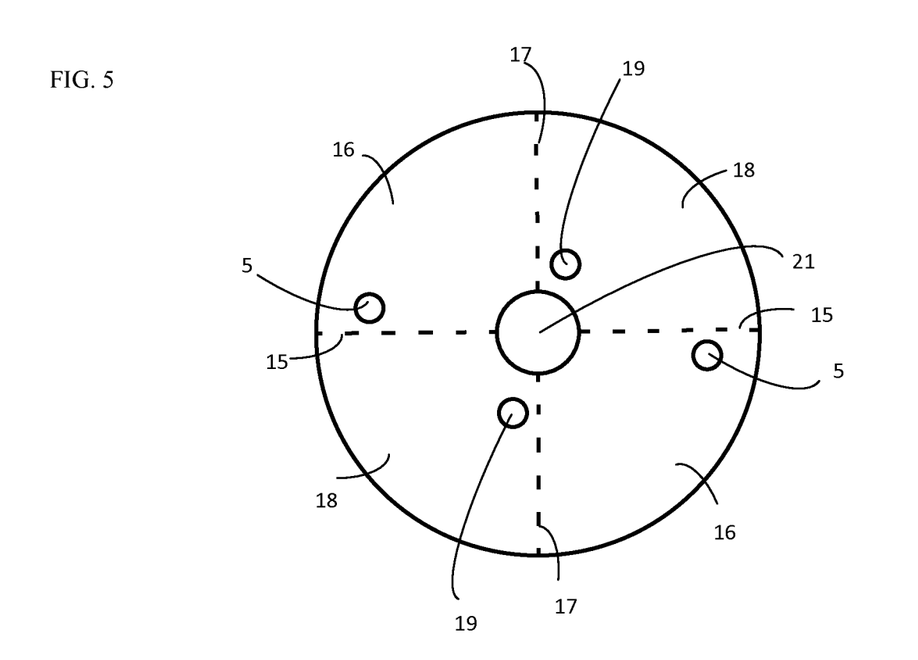
FIG. 5 shows the inside of the back housing where all four cycles of the engine process will take place in a four crest embodiment where the position of the high crests of this back housing align with the high crests of the front housing. This housing will have ports for spark plug or ignition insertion 5, a crank shaft 24 to freely pass through 21, and for oil metering pump insertion 19 if needed for the application. The apex of each crest and valley on the back housing FIG. 5 will mark the end of one function and the beginning of another cycle in the four cycle process; combustion crest 15, exhaust valley 16, intake crest 17 and compression valley 18.

With reference to FIG. 5, the inner surface of the back housing 2 is shown in a direct viewpoint displaying potential locations for spark plug/igniters 5 located at the apex of, or just after crests 15 where combustion will take place on a four crested oscillating rotor engine. Additional spark plug/igniters 5 may be located at additional sites on or after the surface of the combustion crests 15 to optimize ignition in that chamber for the application. Additionally, FIG. 5 shows potential locations for one or more oil metering pumps 19 at or just after the apex of crests 17 to lubricate the oscillating rotor. Additional oil metering pumps may be included in other locations in other embodiments to optimize lubrication for the desired application.

Placement of the front housing FIG. 4 and the back housing FIG. 5 will align the crests 15 of the front housing 1, FIG. 4 with crests 17 of the back housing 2, FIG. 5. This configuration will allow combustion of one side of the oscillating rotor 3 to drive compression and exhaust phases of the opposing side of the oscillating rotor 3 and combustion on either side of the oscillating rotor 3 will not interfere with the combustion cycle of the opposite side.

In an alternate embodiment, with reference to FIG. 6, the inner surface of the front housing 1 is shown in a direct viewpoint displaying potential locations for spark plug/igniters 5 located at the apex of, or just after the crests 15 where combustion will take place on a six crested oscillating rotor engine that mates with the front of the oscillating rotor described in FIG. 3A, FIG. 3B, and FIG. 3C for the corresponding embodiment. Additional spark plug/igniters 5 may be located at additional sites on or just after the surface of the combustion crests 15 to optimize ignition in that chamber for the application. Additionally, FIG. 6 shows potential locations for one or more oil metering pumps 19 at or just after the apex of crests 17 to lubricate the oscillating rotor FIG. 3A, FIG. 3B, and FIG. 3C. Additional oil metering pumps may be included in other locations in other embodiments to optimize lubrication for the desired application.

Figure 7:
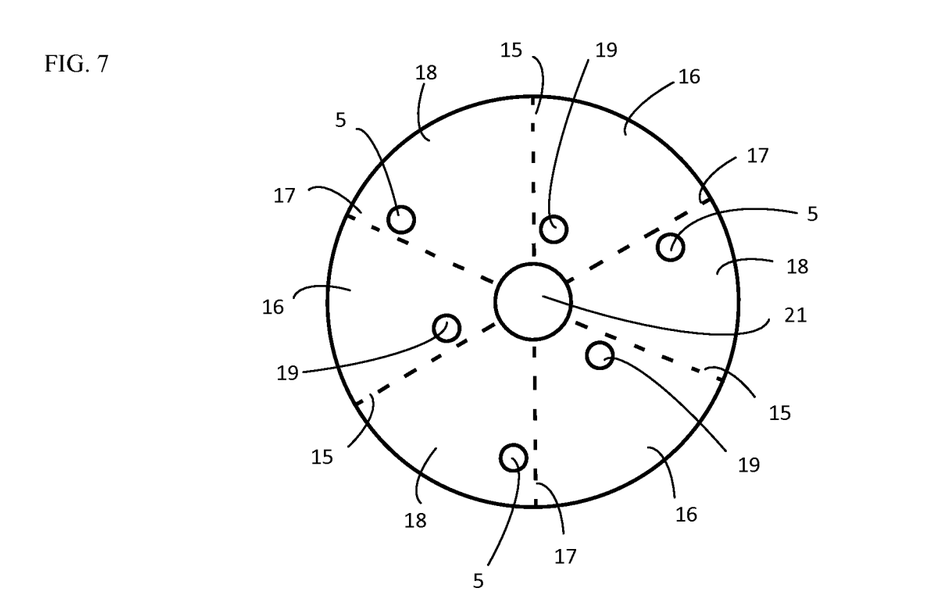
FIG. 7 shows the inside of the back housing where all four cycles of the engine process will take place in a six crest embodiment where the crests of this back housing align with the crests of the front housing. This back housing will have ports for spark plug or ignition insertion 5, a crank shaft 24 to freely pass through 21, and for oil metering pump insertion 19 if needed for the application. Each crest and valley on the back housing FIG. 7 will mark the end of one cycle and the beginning of another cycle in the four cycle process; combustion crest 15, exhaust valley 16, intake crest 17 and compression valley 18.

In the same alternate embodiment, with reference to FIG. 7, the inner surface of the back housing 2 is shown in a direct viewpoint displaying potential locations for spark plug/igniters 5 located at the apex of, or just after the crests 15 where combustion will take place on a six crested oscillating rotor engine that mates with the back of the oscillating rotor described in FIG. 3A, FIG. 3B, and FIG. 3C for the corresponding embodiment. Additional spark plug/igniters 5 may be located at additional sites on or after the surface of the combustion crests 15 to optimize ignition in that chamber. Additionally, FIG. 7 shows potential locations for one or more oil metering pumps 19 at or just after the apex of crests 17 to lubricate the oscillating rotor. Additional oil metering pumps may be included in other locations in other embodiments.

Continuing the description of the alternate embodiment, placement of the front housing FIG. 6 and the back housing FIG. 7 will align the crests 15 of the front housing FIG. 6 with crests 17 of the back housing FIG. 7. This configuration will allow combustion of one side of the oscillating rotor FIG. 3A to drive compression and exhaust phases of the opposing side of the oscillating rotor FIG. 3B and combustion on either side of the oscillating rotor will not interfere with the combustion cycle of the opposite side.

Figure 8A:
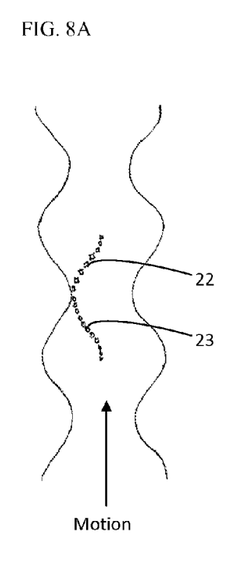
FIG. 8A depicts a potential sinusoidal path that the oscillating rotor may take while moving through the combustion cycles as well as locations for intake 22 and exhaust 23 ports that would be on the outer housing. This travel path, and intake and exhaust location will be guided by the crests and valleys on the front 1 and back 2 housings as well as the oscillating rotor 3 itself, which would in turn also have the sinusoidal shape.
Figure 8B:
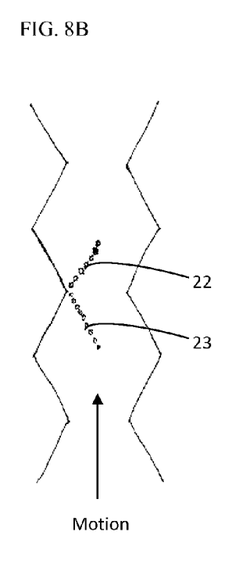
FIG. 8B depicts a potential saw-tooth path that the oscillating rotor may take while moving through the combustion cycles as well as locations for intake 22 and exhaust 23 ports that would be on the outer housing. This pattern will be guided by the crests and valleys on the front 1 and back 2 housings as well as the oscillating rotor 3 itself, which would in turn also have the saw-tooth shape.
Figure 8C:
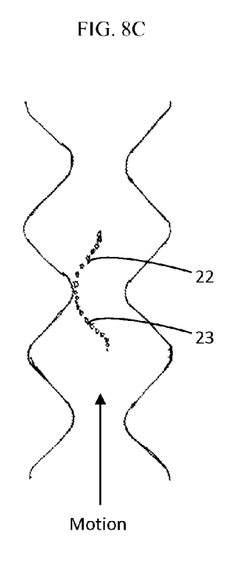
FIG. 8C depicts a potential saw-tooth combined with sinusoidal path that the oscillating rotor may take while moving through the combustion cycles as well as locations for intake 22 and exhaust 23 ports that would be on the outer housing. This pattern will be guided by the crests and valleys on the front 1 and back 2 housings as well as the oscillating rotor 3 itself, which would in turn also have the saw-tooth combined with sinusoidal shape.

FIG. 8A, FIG. 8B, and FIG. 8C represent potential motion paths that an oscillating rotor 3 may travel along during operation in an engine design with any even number of valleys and crests on either side of the oscillating rotor when viewed from the side of the engine as depicted in FIG. 1A, FIG. 1B, and FIG. 1C. This pattern will be created and guided by the crests and valleys on the front and back housings as well as the oscillating rotor itself in any embodiment, which would, in turn, also have the sinusoidal FIG. 8A, saw-tooth FIG. 8B, or combination sinusoidal/saw-tooth FIG. 8C shape defined in the embodiment with an equal number of crests and valleys. This motion path will always turn in the same direction as the crank shaft at a 1:1 ratio and will never reverse direction. The oscillation occurs with the rotation of the rotor rather than forcing the rotor to change direction thereby eliminating any stagnation of the rotor between engine cycles. Other paths of motion can be used depending upon the application desired for the engine. Also shown in FIG. 8A, FIG. 8B, and FIG. 8C are potential locations and shapes for intake ports 22 along the rotation path in the embodiment. These intake ports 22 will be located just after the exhaust phase in the combustion cycle rising from crest 17 in each intake motion of the combustion cycle. Similarly, component 23 show potential locations and shapes for exhaust ports along the rotation path in the embodiments. These exhaust ports will be located at the end of the combustion phase in the combustion cycle rising from crest 15 in each exhaust motion of the combustion cycle. The shape, size and relative location of these intake ports 22 and exhaust ports 23 can be altered to optimize air/fuel and exhaust passage depending upon the use, fuel, engine size and operation speed of the engine.

Figure 9:
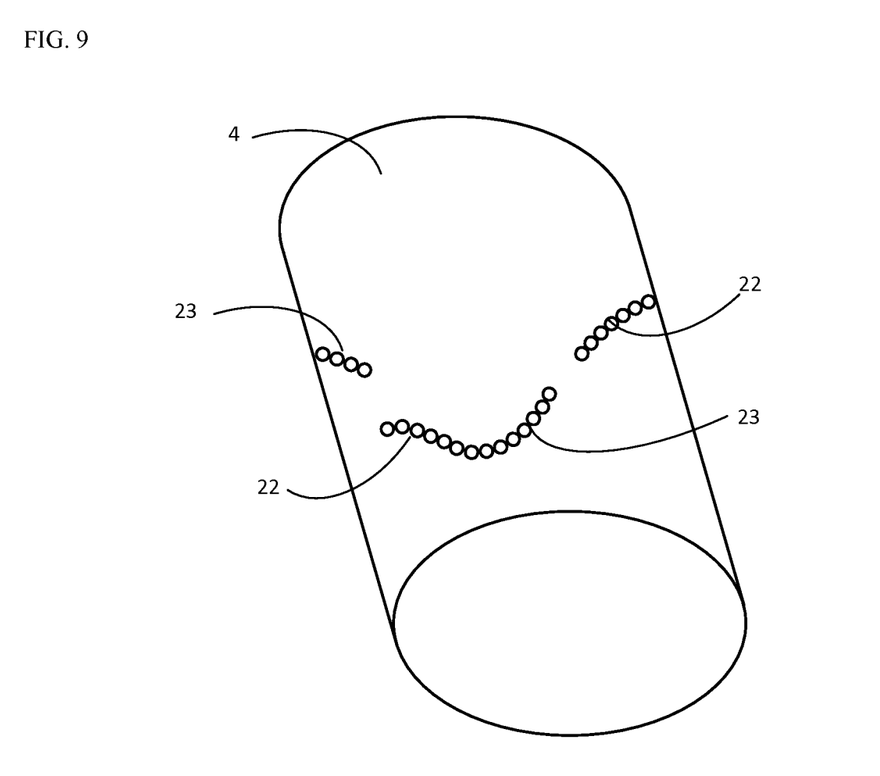
FIG. 9 depicts the outer housing 4 where the front housing and back housing will be mounted to a fixed or adjustable location and oscillating rotator will be contained for motion through combustion cycles. Potential locations and formation of intake 22 and exhaust 23 ports are shown on the outer housing.

FIG. 9 is the outer housing in a cylindrical shape. The external shape of the housing may change to accommodate external ancillary components of an engine embodiment; however the internal shape will always remain cylindrical. Items 22 and 23 portray where potential intake 22 and exhaust 23 ports may be located on the outer housing.

Figure 10:
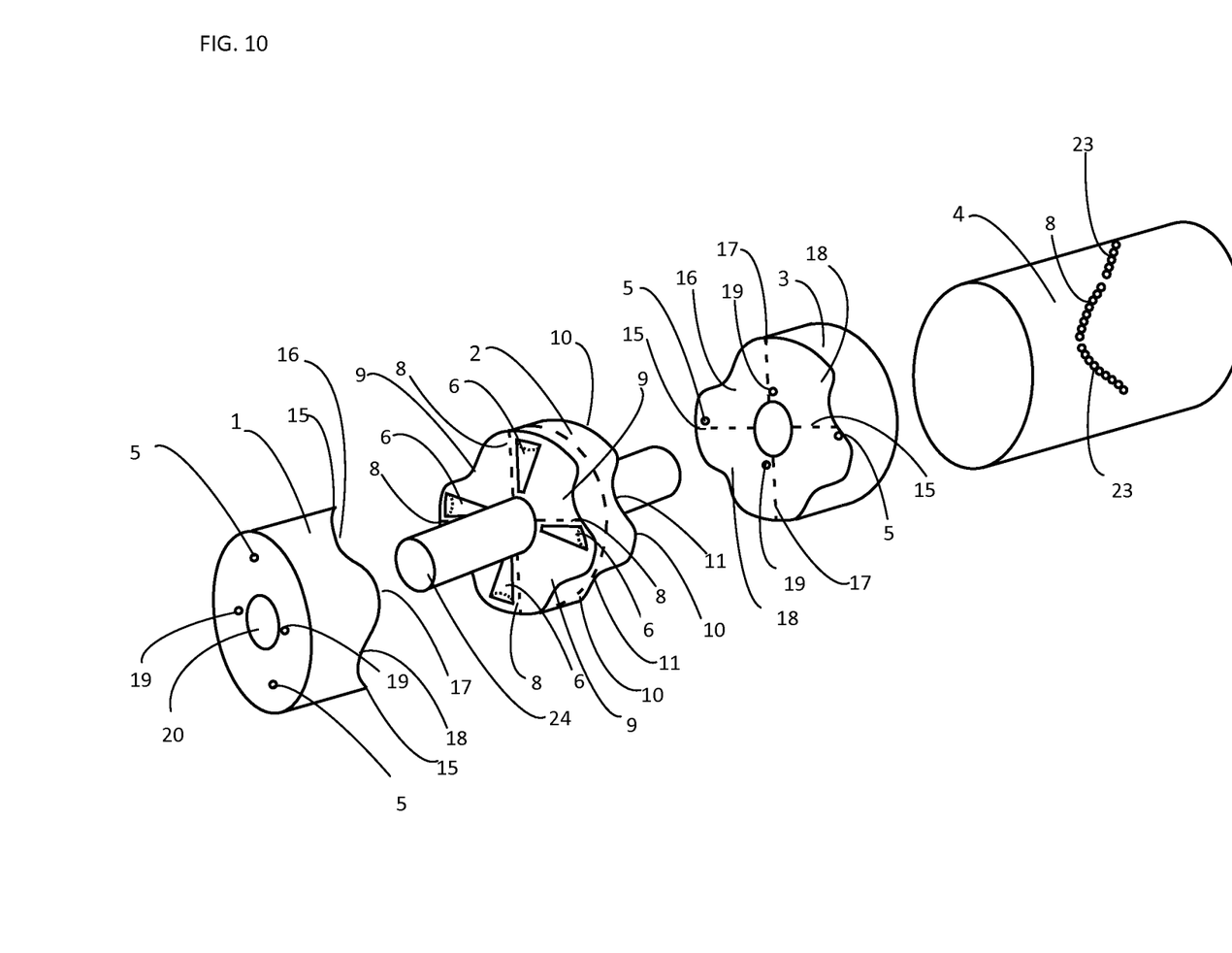
FIG. 10 depicts an exploded view of the Oscillating Rotor Engine which provides a view of the crank shaft 24 which in this embodiment, acts as a seal between the oscillating rotor 3, and the front housing 1 and the back housing 3.

FIG. 10 depicts and exploded view of the engine embodiment with four crests and valleys and depicts how each of the components relates to one another in normal assembly.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

I claim:
1. An oscillating rotating engine device comprising of:
 a. an outer housing,
 b. an oscillating rotor mounted for rotation and oscillation between the front housing, back housing and within the outer housing, the oscillating rotor comprising i. a plurality of crests and valleys expanding radially from the central point on the oscillating rotor on the front and back side of the oscillating rotor, defining at least one chamber extending radially outward from the center, and between adjacent crests, and in relation to the front or back housings, ii. an opening in the center of the oscillating rotor with direct connection or sliding-stationary-gear connection to a crank shaft, c. a front housing and back housing enclosing each oscillating rotor within the outer housing; each front and back housing comprising;

i. a plurality of crests and valleys expanding radially from the central point on the housing, defining at least one chamber extending radially outward from the center, and between adjacent crests, and in relation to the oscillating rotor ii. an opening in the center of either the front housing, back housing or both the front and back housing allowing the crankshaft to pass through.

2. The oscillating rotating engine device of claim 1 wherein the front and back housings are connected to the outer housing in either fixed or adjustable positions.

3. The oscillating rotating engine device of claim 1 wherein further comprising a spark plug configured to ignite the air-fuel mixture within a chamber.

4. The oscillating rotating engine device of claim 1 wherein the inner surface of the outer housing has a cylindrical shape.

5. The oscillating rotating engine device of claim 1 wherein intake ports for ingestion of the air-fuel mixture are located on at least one housing.

6. The oscillating rotating engine device of claim 1 wherein exhaust ports for expulsion of the burnt air-fuel mixture are located on at least one housing.

7. The oscillating rotating engine device of claim 1 wherein oil injectors for lubrication of the oscillator rotation and oscillation are located on at least one of housing.

8. An oscillating rotating engine device comprising:

a. an outer housing, comprising
i. an electrical generator, b. one oscillating rotor mounted for rotation and oscillation in the housing, the oscillating rotor comprising, i. a plurality of crests and valleys expanding radially from the central point on the oscillating rotor, defining at least one chamber extending radially outward from the center, and between adjacent crests, and in relation to the front or back housings, c. a front housing, and back housing enclosing each oscillating rotor within the outer housing; each front and back housing comprising;

i. a plurality of crests and valleys expanding radially from the central point on the housing, defining at least one chamber extending radially outward from the center, and between adjacent crests, and in relation to the oscillating rotor.

9. The oscillating rotating engine of claim 8 wherein the front and back housings are connected to the outer housing in either fixed or adjustable positions.

10. The oscillating rotating engine device of claim 8 wherein further comprising a spark plug configured to ignite the air-fuel mixture within a chamber.

11. The oscillating rotating engine device of claim 8 wherein the inner surface of the outer housing has a cylindrical shape.

12. The oscillating rotating engine device of claim 8 wherein intake ports for ingestion of the air-fuel mixture are located on the at least one housing.

13. The oscillating rotating engine device of claim 8 wherein exhaust ports for expulsion of the burnt air-fuel mixture are located on at least one housing.

14. The oscillating rotating engine device of claim 8 wherein oil injectors for lubrication of the oscillating rotor rotation and oscillation are located on at least one of housing.

15. The oscillating rotating engine of claim 1 or claim 8 wherein the oscillating rotor rotates in the same direction as the crank shaft at a 1:1 ratio continuously.

16. The oscillating rotating engine of claim 1 or claim 8 wherein the oscillating rotor operates without direct reciprocation.

17. The oscillating rotating engine of claim 1 or claim 8 wherein the oscillating rotor operates without stagnation of motion.

18. The oscillating rotating engine of claim 1 or claim 8 wherein the oscillating rotor creates constant circular motion on the crank shaft without a need to transform alternating motion to constant rotary movement of the crankshaft.

* * * * *